Oct. 16, 1951 S. R. ETNYRE 2,571,850
DISTRIBUTOR FOR BITUMINOUS AND LIKE MATERIALS
Filed Oct. 15, 1947 3 Sheets-Sheet 1
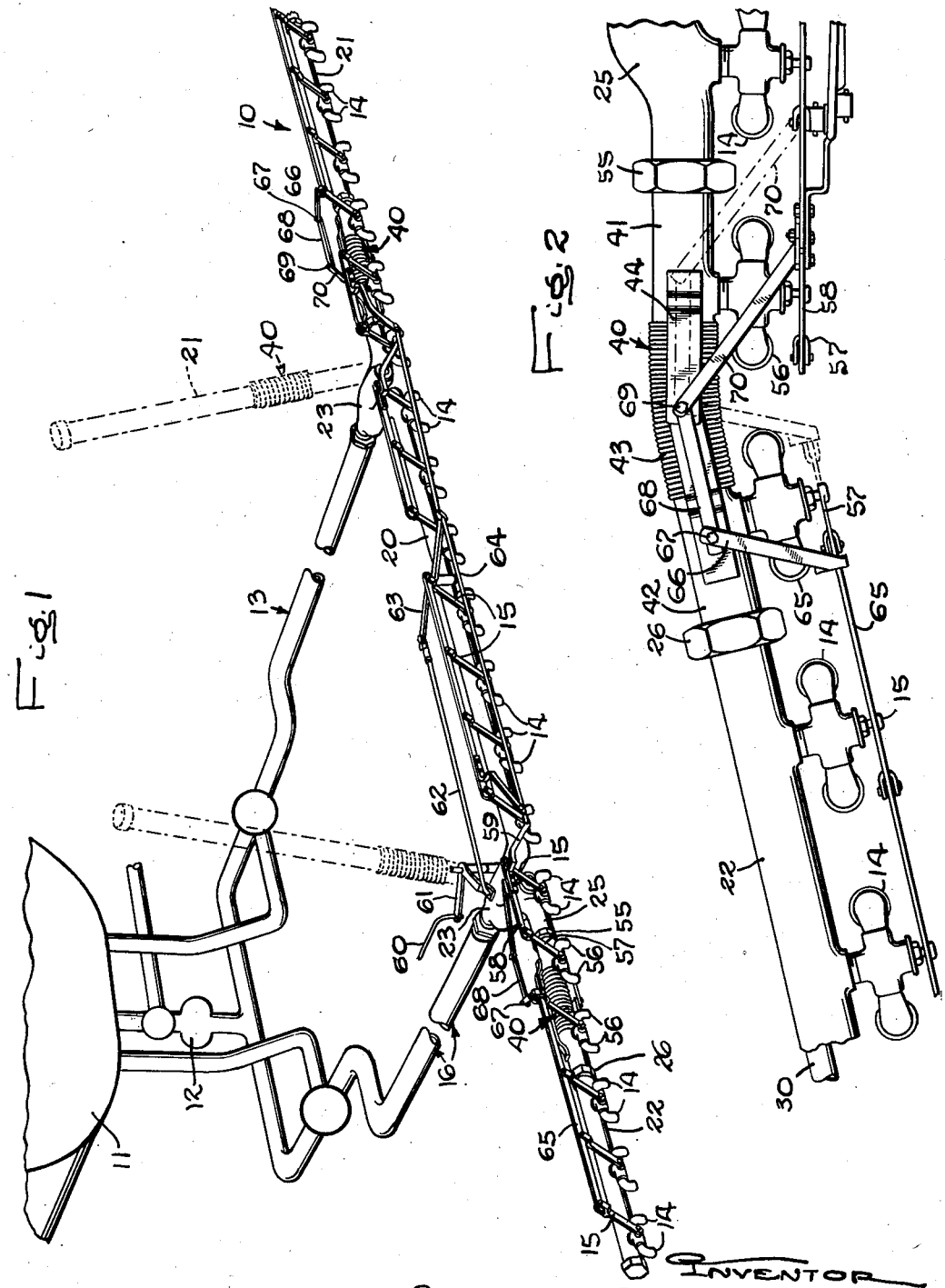
INVENTOR
Samuel R. Etnyre
ATTORNEYS

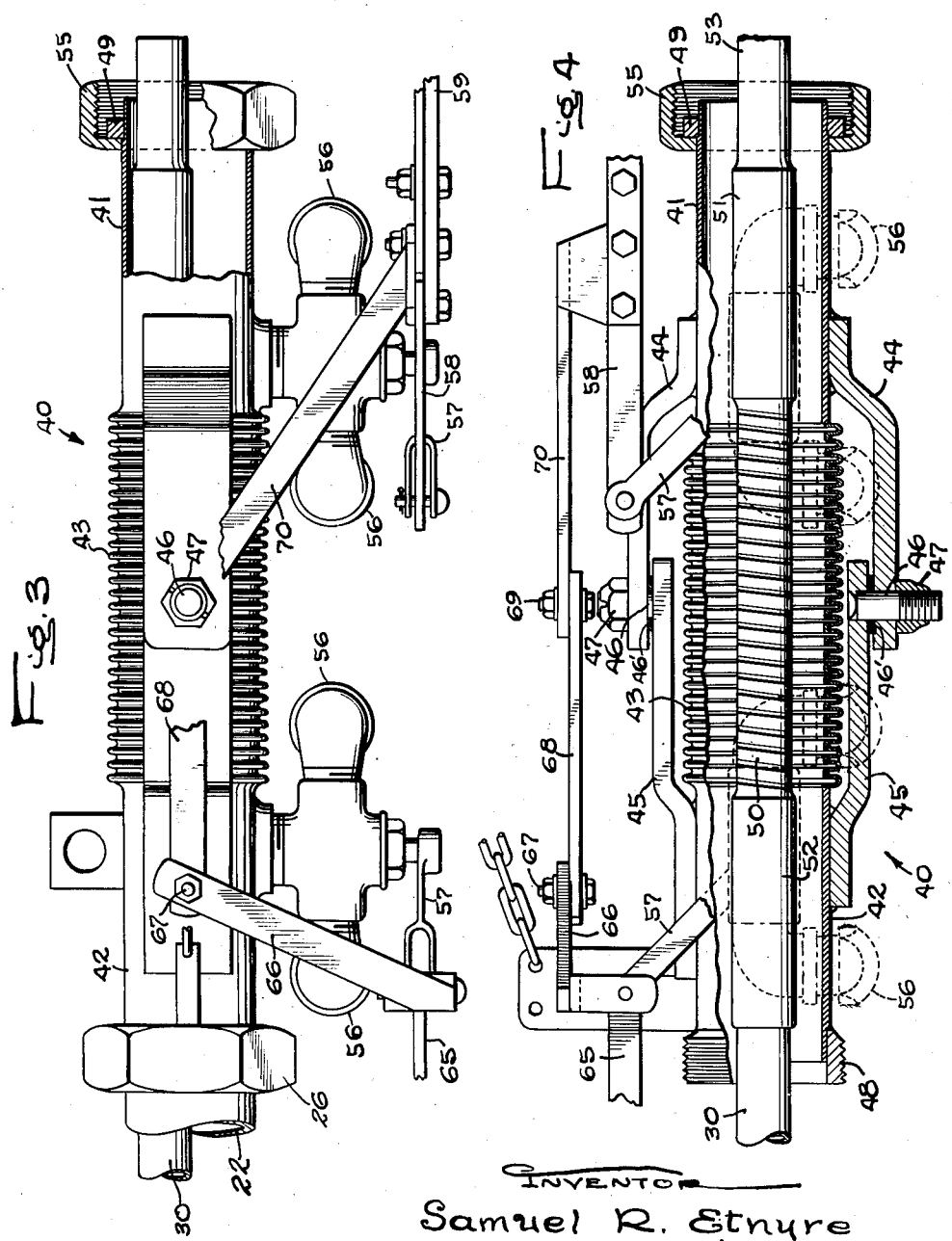

Oct. 16, 1951     S. R. ETNYRE     2,571,850
DISTRIBUTOR FOR BITUMINOUS AND LIKE MATERIALS
Filed Oct. 15, 1947     3 Sheets-Sheet 3
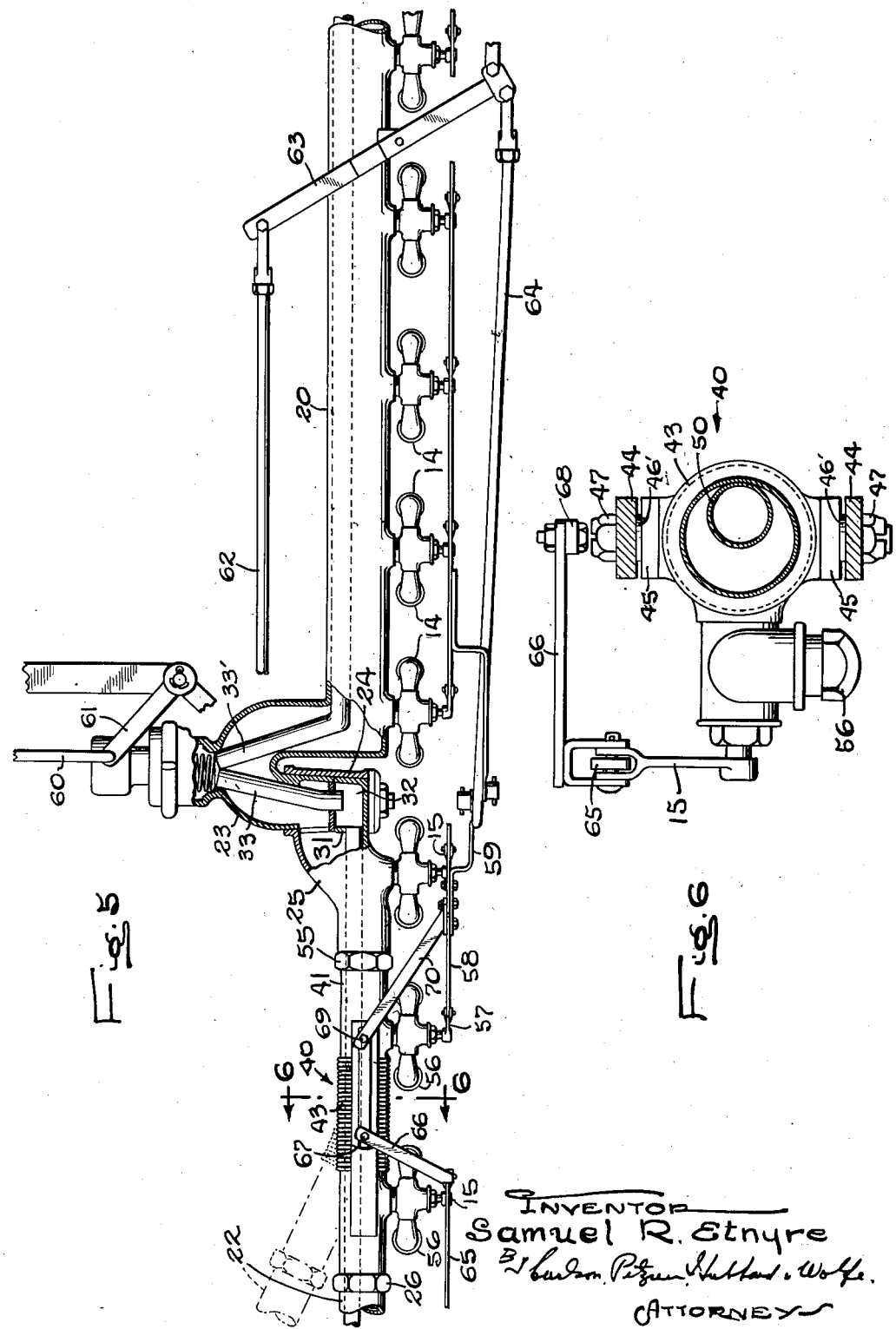
INVENTOR
Samuel R. Etnyre
ATTORNEYS Patented Oct. 16, 1951

2,571,850

UNITED STATES PATENT OFFICE 2,571,850

DISTRIBUTOR FOR BITUMINOUS AND LIKE MATERIALS

Samuel R. Etnyre, Oregon, Ill., assignor to E. D. Etnyre & Co., Oregon, Ill., a corporation of Illinois Application October 15, 1947, Serial No. 780,017

13 Claims. (Cl. 299—34)

1

The invention relates to apparatus for distributing such bituminous and like materials as asphalt, road oil, tar and emulsions employed in road construction and maintenance, and more particularly to an improved distributor bar for use in such apparatus.

One object of the invention is to provide a distributor bar constructed and arranged so that the end portions may yield to pass an obstruction without damage to the bar or to the fittings associated therewith.

Another object is to provide a distributor bar section adapted for assembly with a conventional distributor bar of the circulating type and operative to impart sufficient flexibility to the bar assembly to prevent damage thereto when the bar encounters an obstruction.

Still another object is to provide a distributor bar section which permits the end portions of the bar to be displaced only in a horizontal plane.

A further object is to provide a flexible distributor bar section with associated actuating mechanism for the outlet controlling valves of the bar, which mechanism is adapted to retain its effectiveness when a portion of the bar is deflected from its normal position by encountering an obstacle.

It is also an object of the invention to provide a flexible distributor bar section which is entirely free of leakage.

Other objects and advantages of the invention will become apparent from the following detailed description of the preferred embodiment illustrated in the accompanying drawings, in which:

Figure 1 is a fragmentary view in perspective of distributor apparatus embodying the features of the invention.

Fig. 2 is a top view of the flexible bar section as incorporated in a conventional sectional distributor bar showing the end portion of the bar deflected from its normal operating position.

Fig. 3 is a top view showing the flexible bar section in normal operating position.

Fig. 4 is a longitudinal sectional view of the flexible bar section.

Fig. 5 is a plan and partially sectional view showing details of the joint between the bar sections.

Fig. 6 is a transverse sectional view of the flexible bar section taken in a vertical plane substantially on the line 6—6 of Fig. 5.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the invention has been shown in connection with a distributor bar 10 of the type disclosed in the patent to George M. Etnyre No. 2,346,478, issued April 11, 1944, but it is to be understood that the invention is not limited to use with the particular bar or type of bar shown in the patent. Moreover, the improved distributor bar may be used in various types of distributing systems and in conjunction with various types of supporting and controlling apparatus. As such systems and apparatus are well known in the art, it has not been deemed necessary to illustrate them in detail in the instant application.

The distributing system herein shown comprises a supply tank or reservoir 11 (Fig. 1) supported in the usual manner on a truck chassis or other road vehicle. Material to be distributed is drawn from the tank 11 by a pump 12 and delivered to the distributor bar under pressure by way of a supply conduit 13. In the operation of the apparatus the material is discharged from the bar through a plurality of spray nozzles 14 spaced apart longitudinally of the bar 10. The nozzles as herein shown are arranged in pairs and each pair is provided with a suitable valve having an operating lever 15 by which it may be opened or closed to control the discharge of material from the bar. When the nozzle valves are closed the material is circulated through the bar, as will appear presently, and returned to the tank 11 by way of a return conduit 16.

The exemplary distributor bar 10 is constructed in three sections, including a main or intermediate section 20 and two end sections 21 and 22. The end sections are supported on and connected to the intermediate section by U-shaped fittings 23 which serve as hinge means to permit the end sections to be swung from an operating position axially alined with the intermediate section, as shown in full section in Fig. 1, to a folded or transporting position substantially at right angles to the intermediate section, as shown in broken lines in the drawing. For this purpose, one arm of the fitting 23 is constructed so that it may be connected integrally or permanently to the intermediate section 20, as shown in Fig. 5. The other arm of the fitting is located in the same plane as the intermediate section and has a slightly tapered externally finished surface adapted to receive an internally complemental tubular sleeve 24 formed at one end of a short tubular member 25 having its axis in the same plane as the axis of the intermediate bar section 20. In conventional distributor bars each end section is secured to one of the members 25 as by means of a union including a nut 26 threaded on the member and cooperating with an annular flange or collar on the adjacent end of the section.

To provide for a circulating flow of material through the bar sections 20, 21 and 22 when the discharge nozzles are closed, the sections are formed with contiguous passages through which the material may make a complete circuit of the bar and return to the tank 11 in the manner set forth in said prior patent. For this purpose each of the end sections 21 and 22 has a tube 30 (Figs. 3 and 5) of substantially less diameter than the internal diameter of the section extending from a point closely adjacent the outer end of the section and projecting from the inner end of the section. When the end sections are secured to the tubular members 25, each tube 30 is received in a boss 31 formed as a part of the member. The fittings 23, which are alike in construction, are suitably partitioned to form closed chambers 32 with which the tubes 30 communicate. A short tube 33 communicating with the chamber 32 of the fitting 23 at the left end of the main bar section (as viewed in Fig. 5) and a longer tube 33′ communicating with the corresponding chamber of the fitting at the right end of the main bar section serve as conduits for returning the material from the extremities of the end sections 21 and 22 into the stream of material flowing through the intermediate section 20 whereby a continuous flow of material is maintained throughout the entire length of the distributor bar, as explained in the Etnyre patent referred to above.

In order to minimize damage to the apparatus in case the distributor bar encounters an obstruction when the vehicle upon which it is mounted is in motion, it has been the practice to connect the conduits of the distributing system by means of flexible joints and to support the conduits and the distributor bar by means of a yielding linkage which permits limited front to rear and lateral movement of the conduit and distributor bar assembly. While this arrangement provides adequate protection when the obstacle is encountered by the intermediate bar section, it has been found relatively ineffective when the projecting end sections meet the obstacle. In such cases the end section involved may be bent, or more frequently, the fittings by which it is connected to the distributing system and the intermediate section of the bar are broken. Moreover, the valve operating mechanism is often disabled, making it impossible to shut off the flow of material from the bar in the usual manner.

In accordance with the present invention, the improved distributor bar is constructed so that upon encountering an obstacle the end portions of the bar may yield or bend from their normal position without damage to the bar or parts of the system associated therewith. More particularly, the invention contemplates the provision of a flexible unit 40 between each of the bar sections 21 and 22 and the tubular member 25 connecting those sections with the intermediate section 20. Preferably, the flexible unit is constructed in the form of an auxiliary distributor bar section adapted to be interposed between the intermediate and end sections of a conventional distributor bar without requiring alteration or modification of the latter. Provision is also made for enabling the unit to be incorporated in distributor bars of the circulating type whereby the circulating feature may be utilized to its full extent. Additionally, the unit is provided with a novel linkage for interconnecting the valve actuating means of the intermediate and end bar sections in a manner such that the outlet valves may be opened or closed in the normal manner after a bar section has been deflected by an obstacle.

Referring more particularly to Figs. 3 and 4 of the drawings, the flexible unit or auxiliary bar section 40 in its preferred form comprises a pair of rigid tubular elements 41 and 42 axially alined and connected by a flexible tubular element 43 of approximately the same diameter. The element 43 may be of any suitable construction and as herein shown is a thin-walled metal tube circumferentially corrugated to provide a high degree of flexibility.

To prevent objectionable expansion of the element 43 from the pressure of the material supplied to the distributor bar and to maintain the end bar section in proper operating position, the elements 41 and 42 of the unit are connected by a hinge structure which permits the flexible element 43 to bend only in one plane. As shown in Fig. 4 the hinge structure comprises a pair of elongated metal bars 44 each having one end offset and welded or otherwise secured to opposite sides of the element 41. The bars 44 are extended along the sides of the flexible element 43 and into overlapping relation to a companion pair of bars 45 similarly secured to the tubular element 42. The latter bars are provided with hinge pins 46 which project radially outwardly with respect to the element 45 through washers 46′ of brass or other suitable material and engage in apertures in the bars 44 so that the latter may turn on the pins as pivots. Nuts 47 are threaded on the outer ends of the pins 46 to frictionally hold the elements of the auxiliary bar section in axial alinement. In use, the nuts are tightened sufficiently to prevent the operation of the valve actuating means from swinging the auxiliary bar sections, but yielding in case an obstruction is met to permit the end portions of the bar to bend and pass the obstruction without damage to the parts of the bar. After such displacement, the bar section may be straightened manually.

For cooperation with the material circulating system of the distributor bar with which it is associated, the flexible unit 40 is provided with a material return conduit capable of bending with the unit and adapted to connect the return tube 30 of the adjacent end bar section with the return chamber 32 of the associated fitting 23. The return conduit as shown comprises a flexible intermediate portion 50 in the form of a metal hose extending longitudinally through the flexible element 43 and terminating at opposite ends in rigid sleeve members 51 and 52 disposed in and secured to the tubular members 41 and 42 of the unit. The sleeve member 52 is dimensioned and positioned to receive the projecting end of the tube 30 of the adjacent end bar section, while the sleeve 51 is fitted with a tube 53 adapted to engage in the boss 31 of the member 25 to establish communication between the tube 30 and the return chamber 32 of the fitting 23.

To permit the auxiliary bar section 40 to be installed in a conventional distributor bar, the tubular element 42 is provided at its outer end with an enlarged portion 48 threaded to receive the union nut 26 associated with the end bar section. The other tubular member 41 of the auxiliary bar section has an annular flange or collar 49 on its outer end for cooperation with a union nut 55 adapted to be threaded onto the tubular member 25 of the fitting 23. Thus the auxiliary bar sections may be installed in existing distributor bars without any substantial changes or modifications in the bars.

Distribution of bituminous material over the area spanned by the auxiliary bar section 40 is effected by means of discharge nozzles 56 provided on that section. As shown in Figs. 2-4, the nozzles 56 are arranged in pairs similarly to the nozzles 14 and, in this instance, one pair is mounted on the tubular element 41 and the other pair is mounted on the tubular element 42 of the auxiliary bar section. Uniform spacing of the discharge nozzles is thus maintained throughout the full length of the distributor bar.

As in the case of the regular discharge nozzles 14, each pair of auxiliary nozzles 56 is provided with a control valve having an operating lever 57. The operating lever of the valve adjacent the fitting 23 is operatively connected by a link 58 with the operating lever 15 of the valve associated with the next adjacent pair of nozzles 14, in this instance, the pair mounted on the member 25 of the fitting 23. The link 58 in turn is connected by a short link 59 with the linkage associated with the valves of the intermediate bar section 20. This linkage is of well known construction and is arranged for operation by an operating rod 60 (Fig. 1) through the medium of a bell crank lever 61, a connecting rod 62, a lever arm 63 and a connecting rod 64. The arrangement is such that the various outlet valves may be opened and closed simultaneously by shifting the rod 60 longitudinally forwardly or rearwardly.

Provision is made for connecting the valve operating levers 15 of the end bar sections with the above described valve operating linkage in a manner such that the valves may be opened or closed when the end section is either in its normal operating position or after being deflected by meeting with an obstacle. To this end the operating levers 15 are connected by a link 65 with the operating lever 58 of the auxiliary section valve lever 57 adjacent the end section. A rigid arm 66 extends forwardly from the link 65 over the adjacent end of the auxiliary bar section 40 and is pivotally connected, as by a bolt 67 with one end of a rigid bar 68 extending longitudinally of that section. The other end of the link 68 is pivotally connected, as by a bolt 69, with an arm 70 rigid with and projecting forwardly from the link 58. The arrangement is such that longitudinal movement of the link 58 is transmitted through the arm 70, link 68 and arm 66 to the link 65 to operate the valves located outwardly of the flexible portion 43 of the auxiliary bar section.

Interference with valve operation upon deflection of an end bar section in either direction is prevented by constructing and arranging the links 66 and 70 and link 68 so that the pivots 67 and 69 are alined alternately with the bending axis 46 of the auxiliary bar section when the valves are closed and opened respectively. The linkage is thus enabled to conform to the different positions of the end bar sections and to remain operative to open or close the valves as required.

In operation, the bar sections 20, 21 and 22 are extended horizontally, as shown in Fig. 1. Hinge bars 44 and 45 hold the end bar sections rigidly in a plane parallel to that in which the bar is moved when the vehicle upon which it is mounted is in motion. In practice, the nuts 47 are tightened sufficiently to hold the bar sections against accidental movement in said plane, but yield in case the end bar section meets with an obstruction. In that case, the end bar section is deflected so as to pass the obstruction, the deflection being either rearwardly, as shown in Fig. 2, or forwardly, as shown in Fig. 5, depending upon the direction of movement of the vehicle.

The deflection of the bar section is effected by the bending of the flexible element 43 of the auxiliary bar section 40 so that the bar and the fittings associated therewith are not damaged in any way, nor is the operation of the material circulating system and flow control mechanism interfered with. The outlet valves may therefore be shut off in the usual way to prevent loss or improper distribution of material and the bar may be reconditioned for use by simply bending the flexible element back to its normal straight condition and clamping it there by tightening of the nuts 47.

It will be apparent from the foregoing that the invention provides a distributor bar of novel and advantageous construction. By incorporating flexible auxiliary sections in the bar, provision is made so that the end portions may be deflected to pass an obstruction without damage to the bar or to the fittings associated therewith. The invention provides a flexible auxiliary section for that purpose which is simple and sturdy in construction and which may be readily incorporated in existing distributor bars without requiring any substantial changes or modifications therein. Provision is made for maintaining the bar rigidly in the proper position for distributing material while permitting the bar to yield upon meeting an obstruction whether the vehicle carrying the apparatus is moving either forwardly or rearwardly. Upon such deflection of the bar, the discharge outlets may be closed in the usual way to prevent loss or improper distribution of the material and the bar may be quickly and easily conditioned for reuse.

I claim as my invention:

1. A distributor bar for bituminous and like materials having axially alined main and end sections, valved outlets spaced apart longitudinally of said sections, a flexible auxiliary section interposed between each end section and the main section permitting deflection of the end sections relative to the main section, said auxiliary sections having valved outlets, operating linkages for the valved outlets of each section, the linkages of said auxiliary sections connecting the linkages of said main and end sections and including pivotally interconnected members operative to transmit the movements of one linkage to the other when the end section of the bar has been deflected from its normal position.

2. A distributor bar for bituminous and like materials having main and end sections, valved outlets spaced apart longitudinally of said sections, an auxiliary section interposed between each end section and the main section, said auxiliary sections being flexible about axes perpendicular to the axis of said main section for permitting deflection of the end sections relative to the main section, operating linkages for the valved outlets of said main and end sections, and linkage on said auxiliary sections connecting the linkages of the main and the respective end sections and including rigid arms and links extending over said auxiliary sections, said arms and links being interconnected by pivots located substantially in alinement with said first mentioned axes.

3. In a distributor bar for bituminous material and the like, a pair of tubular bar sections having valved outlets spaced apart longitudinally of the sections, an auxiliary bar section interposed between said sections, said auxiliary section including rigid tubular elements connected by a flexible element permitting deflection of one bar section relative to the other, valved outlets in each of said tubular elements, operating levers for each valved outlet, linkages connecting the operating levers for the valves of each bar section with the operating lever for the valve of the adjacent tubular element, said linkages each having projecting arms extending over said flexible element, and a rigid, articulated link extending between said arms to provide an operative connection between said linkages.

4. In a distributor bar for bituminous material and the like, a pair of tubular bar sections having valved outlets spaced apart longitudinally of the sections, an auxiliary bar section interposed between said sections, said auxiliary section including rigid tubular elements connected by a flexible element permitting deflection of one bar section relative to the other, valved outlets in each of said tubular elements, operating levers for each valved outlet, links connecting the operating levers for the valves of each bar section with the operating lever for the valve of the adjacent tubular element, an arm rigid with each link and projecting therefrom over said auxiliary section, and a rigid, articulated link extending longitudinally of said auxiliary section pivotally secured at opposite ends to said arms for transmitting the movements of one of said links to the other.

5. A distributor bar comprising, in combination, two sections each having valved outlets for the discharge of bituminous and like materials and each having an operating linkage for the valves of the outlets, an auxiliary bar section for connecting said distributor bar sections, said auxiliary bar section comprising a pair of rigid tubular elements, a flexible tubular element connecting said rigid elements, coupling means on each rigid element for attachment to one of the distributor bar sections, and a linkage carried by said auxiliary bar section for connecting the operating linkages of the respective distributor bar sections.

6. An auxiliary bar section for connecting two sections of a distributor bar each having valved outlets for the discharge of bituminous and like materials and each having an operating linkage for the valves of the outlets, said auxiliary bar section comprising a pair of rigid tubular elements, a flexible tubular element connecting said rigid elements, coupling means on each rigid element for attachment to one of the distributor bar sections, a valved outlet for each of said rigid elements, and a linkage for operating the valves of said last-mentioned outlets and additionally serving to connect the operating linkages of the respective distributor bar sections.

7. An auxiliary bar section for connecting two sections of a distributor bar each having valved outlets for the discharge of bituminous and like materials and each having an operating linkage for the valves of the outlets, said auxiliary bar section comprising a pair of rigid tubular elements, a flexible tubular element connecting said rigid elements, coupling means on each rigid element for attachment to one of the distributor bar sections, a valved outlet for each of said rigid elements, means carried by said auxiliary bar section for connecting the operating linkages of the respective distributor bar sections, said connecting means including rigid members interconnected for pivotal movement in a plane substantially parallel to the longitudinal axis of the auxiliary bar section, and hinge means connecting said rigid tubular elements operative to restrict the bending of said flexible element to said plane.

8. An auxiliary distributor bar section comprising, in combination, a pair of rigid tubular elements disposed in end-to-end relation, a tubular element of smaller diameter than said rigid elements extending longitudinally through each rigid element and rigidly secured thereto with its axis offset laterally from the axis of the rigid member, a flexible tubular element connecting adjacent ends of said rigid elements, a flexible tube of smaller diameter than said flexible element connecting adjacent ends of said small diameter elements, and hinge means connecting said rigid elements operative to restrict the bending of said flexible element to a plane common to the axes of all of said tubular elements.

9. A distributor bar comprising, in combination, a tubular main bar section mounted in a horizontal position and adapted to be carried by a road vehicle, valved outlets on said section, an auxiliary bar section hingedly connected at one end of said main bar section, and being swingable to a retracted position for convenient transportation, said auxiliary section comprising a pair of rigid axially alined tubular elements connected by a flexible tubular element permitting deflection of one of said rigid elements from axial alinement with the other element, and hinge means connecting said rigid elements operative to restrict the deflection of said one element to a substantially horizontal plane.

10. A distributor bar for bituminous and like materials having pivotally connected main and auxiliary sections, said auxiliary section comprising a pair of rigid elements connected by a flexible element permitting deflection of the outermost rigid element with respect to the longitudinal axis of said main bar section, said elements defining passageways for the materials, valved outlets for said main bar section and for each of said rigid elements, an operating linkage for the valved outlets of said main bar section, operating linkages for the valved outlets of the respective rigid elements, means connecting the linkage of said main bar section with the linkage of the adjacent rigid element permitting pivotal movement of the element relative to said main bar section, and means connecting the linkage of said adjacent rigid element with the linkage of the other element permitting deflection of the latter element in a plane substantially parallel to the axis of pivotal movement of said adjacent rigid element relative to said main bar section.

11. An auxiliary distributor bar section adapted to be connected at one end to a horizontally disposed main bar section to receive therefrom material to be distributed, said auxiliary section comprising a pair of rigid tubular elements, a flexible tubular element connecting said rigid elements, means for maintaining said elements normally alined in a substantially straight line, said flexible element and said means being yieldable to permit deflection of one rigid element relative to the other, a discharge nozzle opening from each of said rigid elements, valve means controlling the flow of material from said nozzles, and an actuating linkage connecting the valve means of the respective nozzles, said linkage including a rigid arm extending generally laterally from each valve means over the end section, and a rigid link pivotally connected to each of said arms.

12. An auxiliary distributor bar section adapted to be connected at one end to a horizontally disposed main bar section to receive therefrom material to be distributed, said auxiliary section comprising a pair of rigid tubular elements, a flexible tubular element connecting said rigid elements, means for maintaining said elements normally alined in a substantially straight line, said flexible element and said means being yieldable to permit deflection of one rigid element relative to the other, a discharge nozzle opening from each of said rigid elements, valve means controlling the flow of material from said nozzles, means for operating the valve means associated with the rigid element adjacent the main bar section, and a linkage connecting said last-mentioned valve means with the valve means associated with the other rigid element, said linkage being operative to transmit operating movements from one valve means to the other in any of the relative positions of said rigid elements permitted by said flexible element.

13. In a distributor bar for bituminous material and the like, a main bar section and an end bar section, said sections defining passageways therein for the material, outlets spaced apart along said sections, and a pair of pivotal connections between said sections, the axis of one of said pivotal connections being positioned substantially in a horizontal plane to permit displacement of said end section in a generally vertical plane, the axis of the other pivotal connection being substantially vertical to permit displacement of said end section in a substantially horizontal plane.

SAMUEL R. ETNYRE.

REFERENCES CITED

The following references are of record in the file of this patent:

UNITED STATES PATENTS

| Number | Name | Date |
|---|---|---|
| 420,889 | Probert | Feb. 4, 1890 |
| 483,269 | Talley | Sept. 27, 1892 |
| 522,759 | Landis | July 10, 1894 |
| 596,590 | Henderson | Jan. 4, 1898 |
| 680,328 | Henderson | Aug. 13, 1901 |
| 695,925 | Gulland | Mar. 25, 1902 |
| 1,743,245 | Smith | Jan. 14, 1930 |
| 2,014,355 | Hussman | Sept. 10, 1935 |
| 2,346,478 | Etnyre | Apr. 11, 1944 |

FOREIGN PATENTS

| Number | Country | Date |
|---|---|---|
| 497,232 | Great Britain | Dec. 14, 1938 |